Dec. 31, 1929.  S. ELIOT  1,741,688
CLUTCH
Filed Dec. 9, 1927
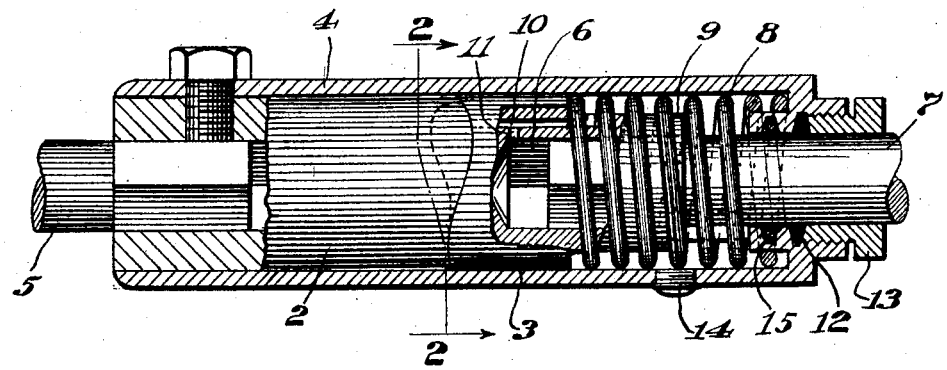
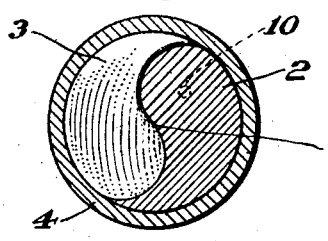 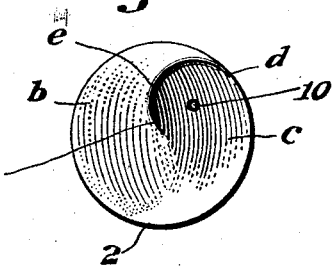
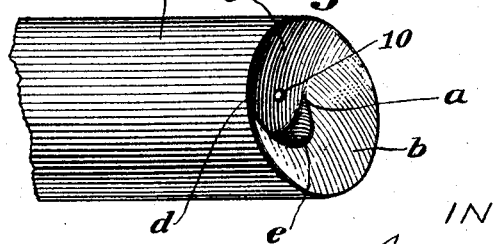
INVENTOR:
Samuel Eliot,
BY J. H. McCrady,
his ATTORNEY Patented Dec. 31, 1929

1,741,688

UNITED STATES PATENT OFFICE

SAMUEL ELIOT, OF MANCHESTER, MASSACHUSETTS

CLUTCH

Application filed December 9, 1927. Serial No. 238,894.

This invention relates to clutches of the one way or overrunning type.

It is the chief object of the invention to devise a clutch of this character which will be substantially noiseless while at the same time being simple in construction, extremely reliable in operation and economical to manufacture.

The nature of the invention will be readily understood from the following description when read in connection with the accompanying drawings, and the novel features will be particularly pointed out in the appended claims.

In the drawings,

Figure 1 is a view, partly in longitudinal cross-section and partly in elevation, showing a clutch constructed in accordance with this invention;

Fig. 2 is a cross-sectional view approximately on the line 2—2, Fig. 1;

Fig. 3 is an end view of the end face of one of the clutch members; and

Fig. 4 is a perspective view of said member.

The construction shown comprises a driving member 2, a driven member 3, and a barrel 4 in which these members are mounted. Preferably, although not necessarily, the barrel 4 is secured to the driving member 2 so that it rotates with it. The latter member also is formed integral with, or secured to, a driving shaft 5. The driven member 3 is provided with an internal cavity or bore 6 of square cross-section to receive slidably the squared end section of a driven shaft 7.

It will be clear from an inspection of the drawings that the two clutch members 2 and 3 are provided with end faces of similar shape or contour. Each face is divided along a curved line $a$ into two approximately equal sections $b$ and $c$. Along a part of this line an abrupt wall is formed. That is, starting at about the point $d$, Fig. 3, the wall gradually increases in height until it reaches about the point $e$ and then it gradually recedes, disappearing entirely at about the center of the end face. The end faces of the two members are of complemental shape or contour so that when they fit one within the other a positive driving connection is provided between them, the abrupt wall of one face bearing against the corresponding wall of the opposite face. It will be observed that the two clutch members are mounted to rotate about the same axis, and so long as the direction of rotation is such as to maintain the two wall surfaces just mentioned in contact with each other, a positive driving connection is maintained between the two members 2 and 3. If, however, the direction of rotation of the driving member 2 should be reversed, or if the mechanism driven by the shaft 7 should cause this shaft to revolve at a greater speed than the driving shaft 5 so that a relative reversal of rotation of the two members takes place, this relative reverse rotation will produce a cam action between the inclined end faces of the two members which will force the driven member 3 back away from the driving member 2 axially of the barrel and thus interrupt the driving connection between the two clutch members.

It will be clear from an inspection of Fig. 1 that the larger part of the driven member 3 forms a piston which is slidable freely in the barrel. A strong spring 8 acts on the part 3 to hold it in driving engagement with its cooperative member 2, this spring encircling a reduced shank portion 9 of the member 3. In order to cushion the movements of the part 3 the space in the barrel 4 is substantially filled with lubricating oil, and a leakage hole or bypass 10 is formed through the part 3 to permit a restricted flow of oil through this member from one end thereof to the other. Leading from this bypass is a hole 11 which opens into the chamber in which the squared end of the shaft 7 slides. Leakage of the oil around the driven shaft 7 is prevented by a stuffing box including a packing 12 and a gland 13 of the usual type. Preferably, also, a scraper ring 15 is used just behind the packing 12 as shown in Fig. 1. A plug 14 threaded through one wall of the barrel provides for the filling or draining of the barrel with oil.

So long as the relative direction of rotation of the two clutch members maintained between the parts 2 and 3 is that for which the device is designed, the spring 8 will hold the parts in positive driving relationship. A reversal of this relative direction of rotation will result in the interruption of the driving connection in the manner above described, and the parts will be held disconnected or out of clutching relationship so long as this reversal is maintained. The presence of the body of oil results in permitting only relatively slow axial movements of the clutch member 3 either toward or from its cooperating clutch member 2, so that both clutching and unclutching movements are effected relatively slowly and without shock or noise. At the same time the parts are very sturdy and substantial in construction, are not liable to become broken, and it is almost impossible for the device to get out of order without breakage of the parts.

It is contemplated that the device may be used in connection with the driving mechanism of motor vehicles and in a great variety of machines.

While I have herein shown and described a preferred embodiment of the invention, it will be understood that the invention may be embodied in other forms without departing from the spirit or scope thereof.

Having thus described my invention, what I desire to claim as new is:

1. In a clutch of the character described, the combination of a barrel, driving and driven clutch members in said barrel revoluble about the axis of the barrel and arranged to be positively connected to and disconnected from each other, one of said clutch members consisting of a piston having a clutch face, said piston being movable axially in said barrel into and out of clutching relationship to the other of said members, and a body of liquid in said barrel for cushioning the movements of said axially movable member.

2. In a clutch of the character described, the combination of a rotary barrel, rotary driving and driven clutch members in said barrel, one of said members revolving with said barrel, said members being relatively movable axially in said barrel into and out of positive clutching relationship to each other, a spring tending to hold said members in clutching relationship, and a body of oil in said barrel, one of said clutch members forming a piston cooperating with said barrel to displace the oil from one side thereof to the other as it moves axially in the barrel into or out of clutching relationship to its cooperating clutch member.

3. In a clutch of the character described, the combination of driving and driven clutch members having end portions provided with faces to positively engage each other and drive one from the other, said members being revoluble about a common axis, a barrel enclosing said members, one of said members forming a piston, said members having cooperating end faces serving to relatively move the members axially out of clutching engagement upon a relative reverse rotation of the members, and a body of oil in said barrel cooperating with said piston member to cushion its axial movement.

4. In a clutch of the character described, the combination of driving and driven clutch members having end portions provided with faces to positively engage each other and drive one from the other, said members being revoluble about a common axis, a barrel enclosing said members and connected with one of said members to rotate therewith, the other of said members forming a piston, said members having cooperating end faces serving to relatively move the members axially out of clutching engagement upon a relative reverse rotation of the members, and a body of oil in said barrel cooperating with said piston member to cushion its axial movement, said piston member having an oil leakage hole therethrough.

5. In a clutch of the character described, the combination of driving and driven clutch members having end portions provided with faces to positively engage each other and drive one from the other, said members being revoluble about a common axis, a barrel enclosing said members, one of said members forming a piston, said members having cooperating end faces serving to relatively move the members axially out of clutching engagement upon a relative reverse rotation of the members, a body of oil in said barrel cooperating with said piston member to cushion its axial movement, a shaft extending into said barrel and having a driving engagement with said piston member but capable of relative sliding movement with reference to said piston member, and a stuffing box carried by said barrel and cooperating with said shaft to prevent the leakage of oil around the shaft.

6. In a clutch of the character described, the combination of driving and driven clutch members having end portions provided with faces to positively engage each other and drive one from the other, said members being revoluble about a common axis, a barrel enclosing said members, one of said members forming a piston, said members having cooperating end faces serving to relatively move the members axially out of clutching engagement upon a relative reverse rotation of the members, a body of oil in said barrel cooperating with said piston member to cushion its axial movement, a shaft extending into said barrel and having a driving engagement with said piston member but capable of relative sliding movement with reference to said piston member, said piston member having an oil leakage hole leading from the oil chamber in said barrel into the space between said faces and to the chamber in said piston in which said shaft slides, and a stuffing box carried by said barrel and cooperating with said shaft to prevent the leakage of oil around the shaft.

SAMUEL ELIOT.